W. NIEDERGESAESS.
SHAFT COUPLING.
APPLICATION FILED APR. 21, 1914.

1,210,969.

Patented Jan. 2, 1917.

WITNESSES:
E. Peterson
A. L. Bowen

INVENTOR:
W. Niedergesaess
BY
Owen Barnes
ATTORNEY

UNITED STATES PATENT OFFICE.

WILHELM NIEDERGESAESS, OF SEATTLE, WASHINGTON.

SHAFT-COUPLING.

1,210,969. Specification of Letters Patent. Patented Jan. 2, 1917.

Application filed April 21, 1914. Serial No. 833,351.

*To all whom it may concern:*

Be it known that I, WILHELM NIEDERGESAESS, a citizen of the United States, residing at Seattle, in the county of King and State of Washington, have invented certain new and useful Improvements in Shaft-Couplings, of which the following is a specification.

This invention relates to improvements in power transmission devices; and its object is to provide simple, efficient and conveniently controlled mechanism whereby motion may be transmitted from a power shaft to rotate selectively either or both of two driven shafts.

The invention consists in the novel construction and combination of parts, as will be hereinafter described and claimed.

Figure 1:
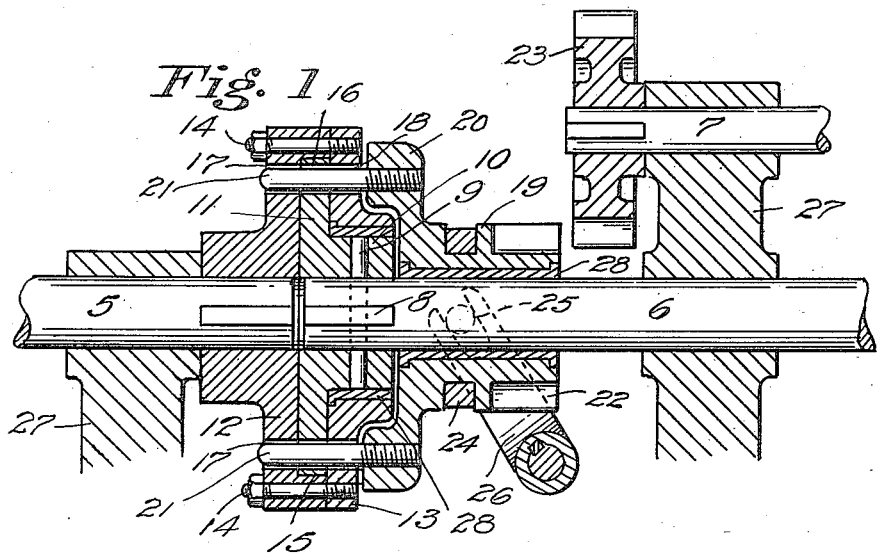
Figure 2:
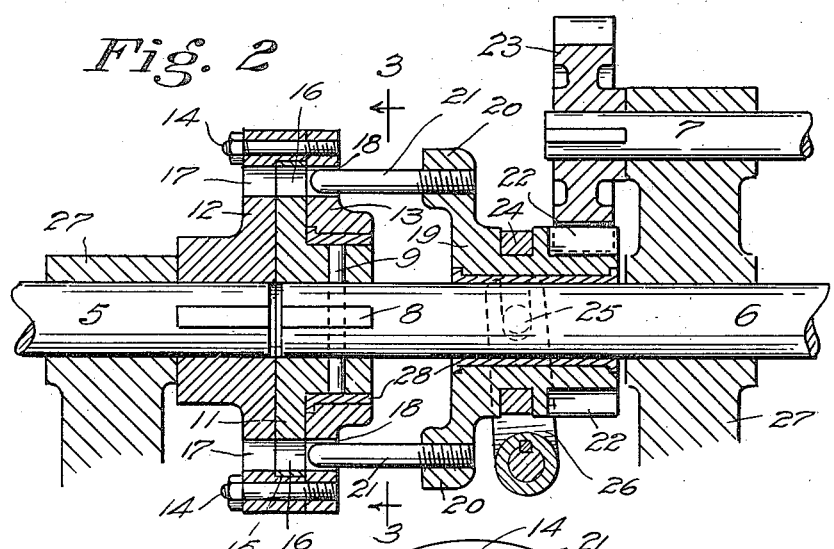
Figure 3:
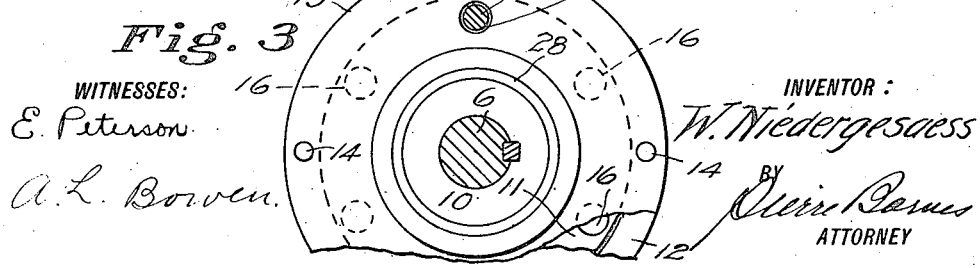

In the accompanying drawings, Figure 1 is a longitudinal sectional view of devices embodying my invention. Fig. 2 is a similar view with the coupling member shown in a position different from that in which it is illustrated in Fig. 1. Fig. 3 is a sectional view on line 3—3 of Fig. 2 and shown partly broken away.

In the drawings, the reference numeral 5 designates a driving shaft, 6 a driven shaft in axial alinement therewith, and 7 is a second driven shaft which, as illustrated, is disposed to be offset from the first named shafts. Mounted upon the end of the shaft 6 and secured thereto as by a key 8 and a pin 9, is a coupling member having a hub 10 and a peripheral flange 11. Keyed or otherwise fixedly secured to the driving shaft 5 is the element 12 of a two-part coupling member, the complementary part 13 being rigidly secured thereto as by bolts 14. The last named coupling member is provided with a chamber 15 to receive the flange 11 of the other member and the coupling members are accordingly secured against independent axial movement, though individually rotatable. Provided in the flange 11 is a plurality of spaced holes 16 disposed concentrically to the axis of the member and provided in the coupling parts 12 and 13, respectively, are holes 17 and 18 arranged in axially alined pairs and at radial distances to correspond with the holes 16.

19 represents a hub having at one end radially extending arms 20 which carry prongs 21 which extend into the holes 18 of the coupling element 13 to serve as guides for the prongs and likewise connect the hub 19 with the member of the driving shaft so that the hub rotates in unison with the latter when such shaft is operating. At its other end hub 19 is provided with peripheral gear-teeth 22 and constitutes a pinion for engaging a gear-wheel 23 which is secured to the shaft 7. Intermediate its length said hub is formed with an annular groove to receive a ring 24 having trunnions, as 25, for engaging the forked arm 26 of a shifter of suitable type.

27 represent frame elements provided with journal bearings for the shafts; and 28 represent bushings or liners affording bearing surfaces at the places indicated.

The operation of the invention is as follows: When the hub 19 is in the position in which it is shown in Fig. 1, the prongs 21 will extend through both of the elements 12 and 13 of the coupling member of the driving shaft 5 and also through holes of the coupling member of the driven shaft 6 and, in consequence, the two shafts 5 and 6 are connected for rotation as a single shaft. With the hub 19 thus positioned, the gear-teeth of the hub will be disengaged from the gear wheel 23 and the shaft 7 is uninfluenced by the shaft 5.

When the hub 19 is moved axially into approximately its remote position with reference to the driving shaft, as illustrated in Fig. 2, the prongs 21 are withdrawn from the coupling elements 12 and 11 but not from the coupling element 13 of the driving shaft 5, resulting in the hub 19 being, through the instrumentality of the prongs, rotated in unison with the driving shaft while the driven shaft 6 remains idle, but inasmuch as the gears 22 and 23 are in mesh, the shaft 7 is caused to rotate. To drive shafts 6 and 7 coincidentally, it is only necessary to move the hub 19 sufficiently far to have the gear 22 engage the gear 23 without withdrawing the prongs 21 from the element 11.

The advantages of the invention reside principally in the employment of a coupling element on a driven shaft which is housed within a coupling member upon the driving shaft, thus obviating relative endwise movements of shafts 5 and 6 and by the use of clutch prongs which are never entirely withdrawn from the coupling member of the driving shaft whereby it is only necessary to have holes 16 of the element 11 register with the alined holes 17 and 18 of the driving member to afford an engagement for the prongs with the driven coupling member.

What I claim as my invention, is—

1. In a device of the class described, the combination with a driving and a driven shaft, of coupling members secured to the respective shafts, one of said members being incased by the other member whereby said members are connected so as to prevent any relative axial movements and allow them to rotate independently of each other, a hub element and clutch pins carried by said hub element and engaging in spaced holes provided in one of said members, said pins being adapted to engage in the holes of the other member when the hub element is suitably shifted.

2. In a device of the class described, the combination with a driving shaft and a driven shaft, of coupling members rigidly secured to the respective shafts and securing the shafts against relative axial movements but affording independent rotary movements to one of the shafts, of means carried by one of said shafts and adapted to be employed for locking said coupling members together so that the two shafts will thereupon be rotatable as a single piece.

3. In a device of the class described, the combination with a driving shaft and a driven shaft disposed in axial alinement with each other, apertured coupling members provided on the respective shafts and engaged against endwise movements, a clutching member loosely mounted on said driven shaft, prongs provided on the clutching member and engaged within the apertures of coupling member of the driving shaft, and means for effecting the endwise movements of said clutching member to cause the prongs thereof to engage in the apertures of the driven member for coupling the two shafts for rotary movements.

4. The combination with two axially alined shafts, of a flanged coupling member fixedly secured to one of said shafts, a coupling member fixedly secured to the other shaft and provided with a recess to receive the flange of the first named member and present internal faces which oppose the outer faces of the flange thereof, said members being provided with holes arranged concentrically of the axis of said shafts, a hub slidably mounted upon one of said shafts, and prongs carried by said hub and adapted to be moved with the latter to engage in the holes of both of said members to couple the same together and cause the prongs to be supported by the second named member at opposite sides of the other member.

Signed at Seattle, Wash., this 7th day of April, 1914.

WILHELM NIEDERGESAESS.

Witnesses:
 PIERRE BARNES,
 HORACE BARNES.